(12) United States Patent
Chang et al.

(10) Patent No.: US 8,249,038 B2
(45) Date of Patent: Aug. 21, 2012

(54) METHOD, PROGRAM, AND SYSTEM FOR IMPLEMENTING CENTRALIZED CONTROL PLANE AND DISTRIBUTED DATA PLANE

(75) Inventors: Xiangqing Chang, Beijing (CN); Xuefeng Zhang, Beijing (CN); Xudong Zou, Beijing (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 203 days.

(21) Appl. No.: 12/808,433

(22) PCT Filed: Jun. 2, 2008

(86) PCT No.: PCT/CN2008/001076
§ 371 (c)(1),
(2), (4) Date: Jun. 16, 2010

(87) PCT Pub. No.: WO2009/086716
PCT Pub. Date: Jul. 16, 2009

(65) Prior Publication Data
US 2010/0260181 A1    Oct. 14, 2010

(30) Foreign Application Priority Data

Jan. 8, 2008    (CN) .......................... 2008 1 0000927

(51) Int. Cl.
*H04W 4/00* (2009.01)
(52) U.S. Cl. ......... 370/338; 370/466; 709/223; 709/251
(58) Field of Classification Search ................... 370/338, 370/466; 709/223, 251
See application file for complete search history.

(56) References Cited

U.S. PATENT DOCUMENTS 6,728,365 B1 *   4/2004   Li et al. .......................... 379/329
2007/0030858 A1 * 2/2007   Chen et al. ..................... 370/463

FOREIGN PATENT DOCUMENTS

| CN | 1394085 A | 1/2003 |
| CN | 1661974 A | 8/2005 |
| CN | 1866845 A | 11/2006 |
| KR | 20010027609 A | 4/2001 |

OTHER PUBLICATIONS

International Search Report: PCT/CN2008/001076.

* cited by examiner

*Primary Examiner* — Jung Park
(74) *Attorney, Agent, or Firm* — Ladas & Parry LLP

(57) ABSTRACT

The present invention discloses a method for implementing centralized control plane and distributed data plane and that comprises the following steps: the main control unit of the main board generates control information and delivers it to the adaptation layer of the main board; the adaptation layer of the main board transmits the control information to the adaptation layer of the service board(s); the adaptation layer of the service board(s) delivers the control information to the data plane and hardware engine of the service board(s). The present discloses a program and system for implementing centralized control plane and distributed data plane. The present invention provides a software architecture using an adaptation layer to implement centralized control plane and distributed data plane to ensure high performance and good scalability of the new architecture, reduce system complexity, and keep system simplicity and efficiency.

8 Claims, 2 Drawing Sheets

METHOD, PROGRAM, AND SYSTEM FOR IMPLEMENTING CENTRALIZED CONTROL PLANE AND DISTRIBUTED DATA PLANE

TECHNICAL FIELD

This invention relates in general to the communication field, especially to a method, program, and system for implementing centralized control plane and distributed data plane.

BACKGROUND OF THE INVENTION

The development of network technologies, especially the emergence of 10 Gigabit Ethernet, poses increasingly high requirements on Layer 4 through 7 processing performance of network security devices. To this end, the existing technologies provide a new flow processing system architecture featuring high performance and good scalability.

However, no matching software architecture is provided along with the new architecture in the existing technologies. Typically, network communication devices such as routers and switches use centralized or distributed software architectures.

FIG. 1 shows the centralized software architecture used by a centralized network communication device, such as router and switch. In this architecture, the main central processing unit (CPU) of the system completes the control and management functions at the control plane and the packet forwarding function at the data plane. Interfaces deliver every received packet to the main CPU of the system. The main CPU searches the forwarding table, completes related service processing, and forwards the packet through the outgoing interface.

FIG. 2 shows the distributed software architecture used by a distributed network communication device, such as router or switch. In distributed software architecture, the system has a special main board and multiple independent interface cards (such as interface card A and interface card B). The control plane resides on both the main board and interface cards, and performs distributed control and management on the system. The data plane on the main board forwards packets locally received or sent and processes services. The data plane on the interface cards performs distributed forwarding and service processing. Upon receiving a packet, the receiving interface of an incoming interface card looks up the local forwarding table. If the packet is destined for the local host and should be processed by the main board, the interface delivers the packet to the main board. If the packet should be forwarded by the local interface card, the interface obtains information of the outgoing interface card and outgoing interface, performs necessary service processing, and sends the packet to the outgoing interface card. The outgoing interface performs necessary service processing and sends out the packet.

As is apparent, in the centralized software architecture of the existing technologies, the main CPU completes both the control and management functions at the control plane, and the forwarding and service processing functions at the data plane, so that the overall system performance is affected. In the distributed software architecture, the control plane needs to be deployed on every interface card to implement distributed management, which is complicated to implement and difficult to develop. Therefore, the existing software architecture restricts the performance and scalability of the new architecture, increases system complexity, and cannot keep system simplicity and efficiency.

SUMMARY OF THE INVENTION

An embodiment of the present invention provides a method and system for implementing centralized control plane and distributed data plane to ensure high performance and good scalability of the new architecture, reduce system complexity, and keep system simplicity and efficiency.

An embodiment of the present invention provides a method for implementing centralized control plane and distributed data plane. The method is applied to the system comprising a main board and service boards, wherein each service board comprises an adaptation layer, and the main board comprises an adaptation layer and a main control unit. The method comprises the following steps:

the main control unit generates control information and delivers the control information to the adaptation layer of the main board;

the adaptation layer of the main board transmits the control information to the adaptation layer of the service board(s); and the adaptation layer of the service board(s) delivers the control information to the data plane and hardware engine of the service board(s), both of which then process data according to the information.

The method also comprises: the adaptation layer of the main board delivering the control information to the data plane and hardware engine of the main board.

The adaptation layer delivering the control information to the data plane and hardware engine, comprises the following steps:

the adaptation layer calls the data plane interface to deliver the control information to the data plane;

the data plane calls the interface of the hardware processing engine to deliver the control information to the hardware processing engine;

or, the adaptation layer calls the data plane interface to deliver the control information to the data plane, and calls the interface of the hardware processing engine to deliver the control information to the hardware processing engine.

The adaptation layer of the main board transmitting the control information to that of the service board(s), comprises:

unicasting the control information to a specific service board, or broadcasting or multicasting the control information to multiple service boards.

Multicasting to multiple service boards further comprises the following steps:

service boards receiving data are added to the same group; and the main board sends the control information containing the ID of the group to the group so that all service boards in the group can receive data of the group.

Unicasting to a specific service board further comprises the following step:

The main board attaches the slot number of the target service board in the control information so that the target service board can receive data accordingly.

An embodiment of the present invention also provides a program for implementing centralized control plane and distributed data plane and is stored in a computer-readable storage medium. The program comprises:

instructing the main control unit of the main board to generate control information and deliver the control information to the adaptation layer of the main board;

instructing the adaptation layer of the main board to transmit the control information to the adaptation layer of the service board(s); and instructing the adaptation layer of the service board(s) to deliver the control information to the data plane and hardware engine of the service board(s), both of which can process data according to the information.

An embodiment of the present invention also provides a system for implementing centralized control plane and distributed data plane. The system comprises a main board and service boards. Each service board comprises an adaptation layer and the main board comprises an adaptation layer and a main control unit, wherein:

the main control unit is used to generate control information and deliver the control information to the adaptation layer of the main board; and the adaptation layer of the main board is used to deliver the control information to the data plane and hardware engine of the service board(s) through the adaptation layer of the service board(s), both of which can process data according to the information.

The adaptation layer of the main board comprises a control information forwarding unit, which is used to transmit control information to the adaptation layer of the service board and further comprises:

a unicast forwarding subunit that unicasts control information to a specific service board; or a multicast forwarding subunit that broadcasts or multicasts control information to multiple service boards.

The adaptation layer of the main board connects to the data plane and hardware engine of the main board to deliver control information to them.

The adaptation layer of the main board or service board(s) comprises a control information delivery unit, which is used to deliver control information to the data plane and hardware engine of the main board or service board(s); and the control information delivery unit comprises:

a direct delivery subunit, where the adaptation layer calls the data plane interface to deliver control information to the data plane, and then the data plane calls the interface of the hardware processing engine to deliver the control information to the hardware processing engine; or an indirect delivery subunit, where the adaptation layer calls the data plane interface to deliver control information to the data plane, and then calls the interface of the hardware processing engine to deliver the control information to the hardware processing engine.

Compared to the existing technologies, the present invention has the following benefits:

The present invention provides a software architecture implementing centralized control plane and distributed data plane through the adaptation layer, delivers high performance and good scalability of the new architecture, reduces system complexity, and keeps system simplicity and efficiency.

DETAILED DESCRIPTION OF THE INVENTION

The following describes embodiments of the present invention in details. The embodiments described are for example only and do not limit the invention.

The present invention implements centralized control plane and distributed data plane, and uses the adaptation layer to connect centralized control plane and distributed data plane, thus ensuring transmission of control and management commands and messages among the control plane, data plane, and hardware processing engine.

Figure 1:
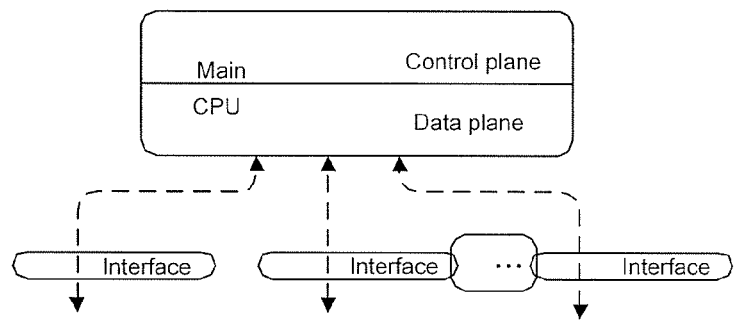
FIG. 1 is a block diagram of the centralized software architecture in the existing technologies
Figure 2:
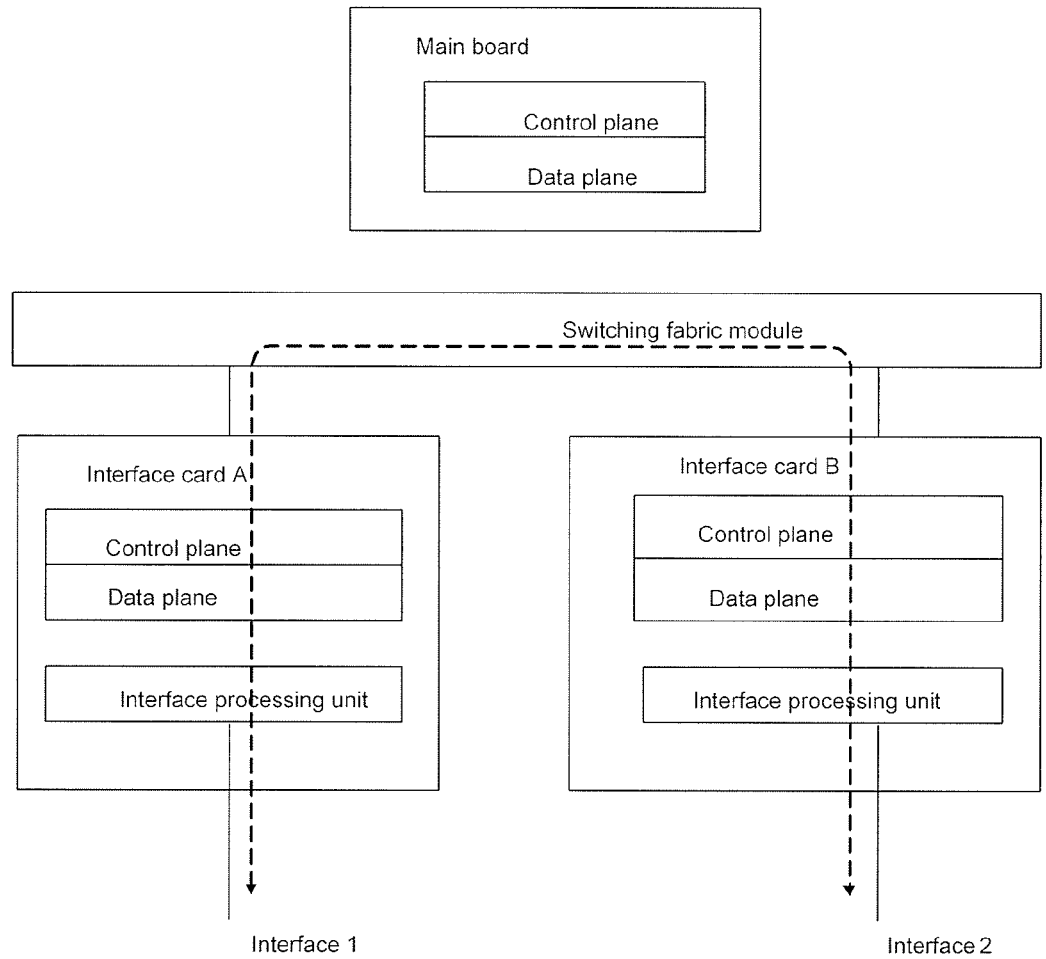
FIG. 2 is a block diagram of the distributed software architecture in the existing technologies.
Figure 3:
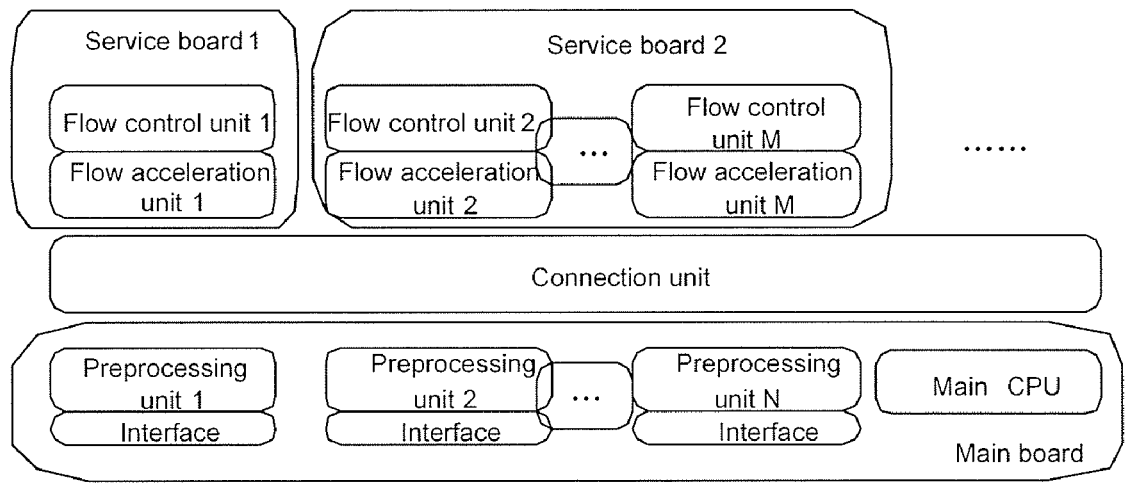
FIG. 3 is a block diagram of the flow processing system architecture featuring high performance and good scalability in the present invention.

As shown in FIG. 3, the present invention uses a flow processing system architecture featuring high performance and good scalability, which comprises: a main board and multiple service boards (service board 1 and service board 2 in the embodiment). The main board comprises N preprocessing units, the corresponding N interfaces, and a main CPU, while service board 1 comprises a flow acceleration unit and the corresponding flow control unit, and service board 2 comprises M-1 flow acceleration units and the corresponding M-1 flow control units. The main board communicates with the service boards through a connection unit. The main CPU implements control plane functions on the main board only, but not on service boards. Thus, the system implementation is simplified.

A preprocessing unit checks, analyzes, classifies, and filters incoming packets, and obtains the 5-tuple of packets. If sessions have been established for packets, the preprocessing unit searches the flow table by using the 5-tuple or 6-tuple (uniquely identifying a flow) as an index, distributes each data flow to the corresponding flow processing unit (comprising a flow control unit and a flow acceleration unit) for processing, and attaches the session ID of the flow to the flow processing unit to accelerate processing. If sessions have been established for packets, the preprocessing unit distributes the packets to a particular flow processing unit according to the flow distribution policies (such as rules, forwarding information, tunneling information, related flow information, and the load balancing algorithm) of the preprocessing unit, and then the preprocessing unit outputs the packets that have been processed by the flow processing unit.

The flow processing unit comprises a flow acceleration unit and a flow control unit. The flow control unit establishes new sessions, handles TCP half-open connections, and sends the processed session and behavior information to the flow acceleration unit (meanwhile, the preprocessing unit uses 5-tuples or 6-tuples as the indexes of the flow table) to accelerate processing of subsequent packets. The flow control unit processes the packets, for which sessions have been established, according to the session and behavior information and sends them to the preprocessing units of the corresponding interfaces according to the forwarding information.

Figure 4:
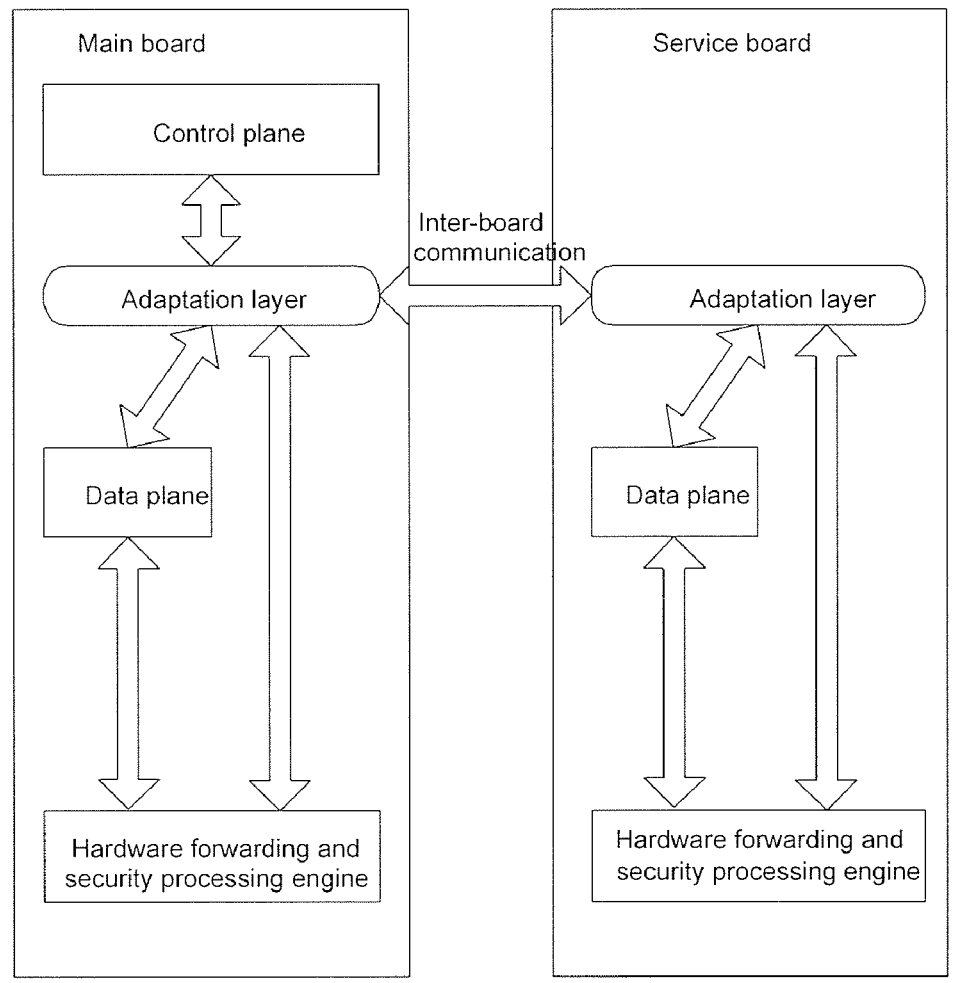
FIG. 4 is a block diagram of the software architecture implementing centralized control plane and distributed data plane through the adaptation layer.

The present invention provides a system for implementing centralized control plane and distributed data plane, as shown in FIG. 4. The system comprises a main board and service boards, wherein each service board comprises an adaptation layer, and the main board comprises an adaptation layer and a main control unit (that is, the main CPU). The adaptation layer on the main board communicates with that of the service board(s) through the connection unit. The main control unit of the main board generates control information, such as entries, and transmits the control information to the adaptation layer of the main board. The adaptation layer of the main board delivers the control information to the data plane and hardware engine (that is, the flow control unit) of the service board(s) through the adaptation layer of the service board(s). Then the data plane and hardware engine process data according to the control information.

Generally, the main board seldom performs data plane processing. However, the present invention provides technical solutions for special cases. In the solutions, the adaptation layer of the main board connects to the data plane and hardware engine of the main board so that the control information can be delivered to the data plane and hardware engine for data processing.

The adaptation layer mainly implements driver interfaces on the control plane and synchronizes data that will be distributed to the data plane. Thus, the adaptation layer updates all driver interfaces of the data that the data plane needs. If the hardware engine that the driver interface represents, such as a network processor (NP), also needs updating, the adaptation layer needs to send data to the data plane, and call the interface of network planning solution (NPS) to deliver data to the NP.

Driver interface implementation comprises local call processing and distributed call processing.

In local call processing, the driver interfaces called by debugging commands can use synchronous or asynchronous interprocess communications/remote procedure call (IPC/RPC), and can be classified into GET-type driver interfaces and SET-type driver interfaces. GET-type driver interfaces require that the operation results are returned synchronously. When IPC/RPC is used, the driver interfaces (including GET-type and SET-type) must be called asynchronously. As a result, local call processing is implemented when the GET-type driver interfaces are called. If the GET-type driver interfaces of a centralized data plane want to obtain the summary of the whole system containing all service boards, they can periodically collect information of each service board, summarize the information, and send the summary to the main board. Local call processing is implemented to obtain the summary when the main board calls GET driver interfaces.

SET-type driver interfaces also need distributed call processing after local call processing. After implementing those, the driver interfaces must decide whether the processing is successful or not, and how to handle a failure. Local call processing returns call results synchronously. If synchronous IPC/RPC is used, distributed call processing returns call results synchronously. If distributed call processing uses asynchronous IPC/RPC, asynchronous IPC/RPC returns the tasks directly instead of suspending them, and sends results in the subsequent call functions. When local call processing or synchronous call processing fails, the allocated resources are released. If asynchronous distributed call processing fails, logs are recorded. In addition, because currently drivers do not save control information, they cannot deliver control information by itself when receiving a notification of asynchronous call processing failure. To deliver the control information again, a driver interface can be added for requesting the platform to refresh the control information.

The adaptation layer of the main board or service boards comprises a control information delivery unit, which is used to deliver the control information to the data plane and hardware engine (for example, the NP) of the local board.

The control information delivery unit further comprises: a direct delivery subunit, wherein the adaptation layer calls a data plane interface to deliver the control information to the data plane, and the data plane then calls the interface of the hardware processing engine to deliver the control information to the hardware processing engine; or an indirect delivery subunit, wherein the adaptation layer calls a data plane interface, delivers the control information to the data plane, and calls the interface of the hardware processing engine to deliver the control information to the hardware processing engine.

In addition, the adaptation layer of the main board also comprises a control information forwarding unit, which is used to send the control information to the adaptation layer of each service board. The control information forwarding unit further comprises: a unicast forwarding subunit, which unicasts the control information to a specific service board by attaching the slot number of the target service board in the control information; or a multicast forwarding subunit, which broadcasts or multicasts the control information to multiple service boards. The multicast mode refers to one-to-multiple communication between the main board and multiple service boards, wherein the main board sends the control information that contains a group ID so that all the service boards added to the group with this group ID can receive data destined for the group. Service boards can send requests to the main board for joining or quitting a group. The main board replicates and forwards data only to the service boards in the group. Therefore, data is transmitted to requesting multiple service boards (that have joined the same group) at the same time, and does not affect other service boards that do not join the group.

The present invention also provides a method to implement centralized control plane and distributed data plane. This method is applied to the system comprising service boards and a main board, wherein each service board comprises an adaptation layer, and the main board comprises an adaptation layer and a main control unit. The control plane sends to the data plane the control information, such as the control information for the forwarding information base (FIB) or virtual local area network (VLAN). The method comprises the following steps:

At step s301, the main control unit of the main board generates control information and transmits the control information to the adaptation layer of the main board;

At step s302, the adaptation layer of the main board delivers the control information to the data plane and hardware engine of the main board, both of which can process data according to the control information. In general, the main board does not process data, and thus this step is skipped.

At step s302, wherein the adaptation layer calls the data plane interface to deliver the control information to the data plane, and the data plane then calls the interface of the hardware processing engine to deliver the control information to the hardware processing engine; or the adaptation layer calls the data plane interface to deliver the control information to the data plane, and the data plane then calls the interface of the hardware processing engine to deliver the control information to the hardware processing engine.

At step s303, the adaptation layer of the main board transmits the control information to the adaptation layer of the service board(s), wherein the adaptation layer unicasts the control information to a specific service board, or broadcasts or multicasts the control information to multiple service boards. In other words, the control information is correlated to the corresponding flow processing unit, so that the preprocessing unit can send subsequent packets to that flow processing unit for processing.

Multicasting to multiple service boards further comprises: receiving service boards are added to the same group; the main board sends the control information containing the group ID to the group so that all service boards in the group can receive data for the group.

Unicasting to a specific service board further comprises the following step: The main board attaches the slot number of the target service board in the control information so that the target service board can receive data accordingly.

At step s304, the adaptation layer of the service board(s) delivers the control information to the data plane and hardware engine of the service board(s), both of which can process data according to the information. Wherein, the adaptation layer calls a data plane interface to deliver the control information to the data plane, and the data plane then calls the interface of the hardware processing engine to deliver the control information to the hardware processing engine; or the adaptation layer calls the data plane interface to deliver the control information to the data plane, and the data plane then calls the interface of the hardware processing engine to deliver the control information to the hardware processing engine. Then the preprocessing unit transmits subsequent packets to the flow processing units according to the 5-tuple in the control information.

As is apparent, the inventors and those skilled in the art recognize clearly that the present invention is implemented by using software and a necessary generic hardware platform. The present invention can be implemented by using hardware only; however, the former is preferable. Concerning this, the technical solutions of the present invention or those contributing to the present invention can be represented by a software product. The software product is stored in a storage medium and comprises instructions that enable a computing device (which can be a PC, server, or network device) to perform the method described in each embodiment of the present invention. The embodiment of the present invention also provides a program for implementing centralized control plane and distributed data plane, and is stored in a computer-readable storage medium. The program comprises:

instructing the main control unit of the main board to generate control information and deliver the control information to the adaptation layer of the main board;

instructing the adaptation layer of the main board to send the control information to that of the service board; and instructing the adaptation layer of the service board to deliver the control information to the data plane and hardware engine of the service board, both of which can process data according to the information.

As several embodiments describe the present invention, the terminologies used are just descriptive and exemplary rather than restrictive. Because the present invention presents embodiments in various forms, a person skilled in the art could make various modifications and transformations without departing from the spirit and scope of the present invention as defined by the appended claims.

The invention claimed is:

1. A method, which implements centralized control plane and distributed data plane for the system comprising service boards and a main board, wherein each service board comprises an adaptation layer, and the main board comprises an adaptation layer and a main control unit, the method comprising the following steps:

the main control unit of the main board generating control information and delivers the control information to the adaptation layer of the main board;

the adaptation layer of the main board transmitting the control information to that of the service board; and the adaptation layer of the service board delivering the control information to the data plane and hardware engine of the service board, both of which then process data according to the information; wherein the adaptation layer delivering the control information to the data plane and hardware engine comprises the following steps:

the adaptation layer calls a data plane interface to deliver the control information to the data plane;

the data plane calls an interface on a hardware processing engine to deliver the control information to the hardware processing engine;

or, the adaptation layer calls a data plane interface to deliver the control information to the data plane, and calls an interface on a hardware processing engine to deliver the control information to the hardware processing engine.

2. The method of claim 1, further comprising: the adaptation layer of the main board delivering the control information to the data plane and hardware engine of the main board, both of which then process data according to the control information.

3. The method of claim 1, wherein the adaptation layer of the main board sending the control information to that of the service board comprises:

unicasting the control information to a specific service board, or broadcasting or multicasting the control information to multiple service boards.

4. The method of claim 3, wherein multicasting to multiple service boards comprises the following steps:

the service boards receiving data are added in the same group;

the main board sends the control information containing the group ID to the group so that all the service boards in the group can receive data of the group; and unicasting to a specific service board comprises the following step:

the main board attaches the slot number of the target service board in the control information so that the target service board can receive data accordingly.

5. A non-transitory computer readable storage medium, comprising a computer program which implements centralized control plane and distributed data plane and is stored in a computer-readable storage medium, wherein the program is executed to:

instructing the main control unit of the main board to generate control information and deliver the control information to the adaptation layer of the main board;

instructing the adaptation layer of the main board to send the control information to that of the service board(s); and instructing the adaptation layer of the service board(s) to deliver the control information to the data plane and hardware engine of the service board(s), both of which then process data according to the information; wherein the adaptation layer delivering the control information to the data plane and hardware engine comprises the following steps:

the adaptation layer calls a data plane interface to deliver the control information to the data plane;

the data plane calls an interface on a hardware processing engine to deliver the control information to the hardware processing engine;

or, the adaptation layer calls a data plane interface to deliver the control information to the data plane, and calls an interface on a hardware processing engine to deliver the control information to the hardware processing engine.

6. A system, which implements centralized control plane and distributed data plane and contains service boards and a main board, wherein each service board comprises an adaptation layer and the main board comprises an adaptation layer and a main control unit; wherein the main control unit is used to generate control information and deliver the control information to the adaptation layer of the main board; and the adaptation layer of the main board is used to deliver the control information to the data plane and hardware engine of the service board(s) through the adaptation layer of the service board(s), both of which can process data according to the information; wherein the adaptation layer of the main board or service board(s) comprises a control information delivery unit, which is used to deliver the control information to the data plane and hardware engine of the local board; and the control information delivery unit comprises:

a direct delivery subunit, where the adaptation layer calls a data plane interface to deliver the control information to the data plane, which then calls an interface on a hardware processing engine to deliver the control information to the hardware processing engine; or an indirect delivery subunit, where the adaptation layer calls a data plane interface to deliver the control information to the data plane, and then calls an interface on a hardware processing engine to deliver the control information to the hardware processing engine.

7. The system of claim 6, wherein the adaptation layer of the main board comprises a control information forwarding unit, which is used to send the control information to the adaptation layer of the service board and comprises:

a unicast forwarding subunit, where users unicast control information to a specific service board; or a multicast forwarding subunit, where users broadcast or multicast control information to multiple service boards.

8. The system of claim 6, wherein the adaptation layer of the main board connects to the data plane and hardware engine of the main board to deliver control information to them.

* * * * *